Figure 1:
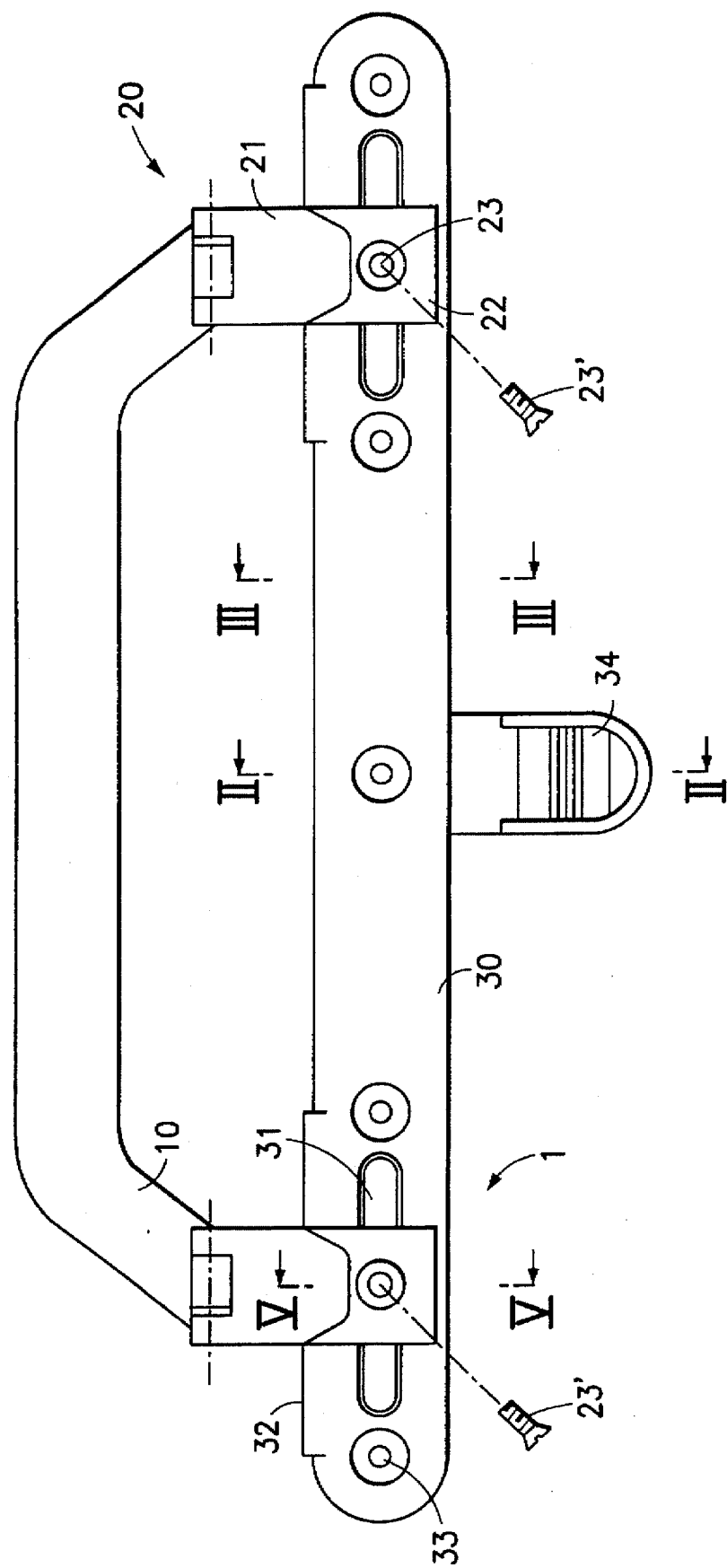

United States Patent [19]
Ortlieb

[11] Patent Number: 5,673,833
[45] Date of Patent: Oct. 7, 1997

[54] DEVICE FOR HOLDING BAGS ON BICYCLES, MOTORCYCLES AND THE LIKE

[76] Inventor: Hartmut Ortlieb, Rehdorfer Str. 5, D-90431 Nuremberg, Germany

[21] Appl. No.: 351,460

[22] PCT Filed: Jun. 8, 1993

[86] PCT No.: PCT/DE93/00500
§ 371 Date: Mar. 28, 1995
§ 102(e) Date: Mar. 28, 1995

[87] PCT Pub. No.: WO93/25430
PCT Pub. Date: Dec. 23, 1993

[30] Foreign Application Priority Data

Jun. 9, 1992 [DE] Germany ............... 9207525 U

[51] Int. Cl.$^6$ .................................................. B62J 7/00
[52] U.S. Cl. ................. 224/425; 224/419; 224/447
[58] Field of Search ................. 224/32 R, 34, 224/35, 36, 37, 38, 39, 42, 30 A; 24/601.5; 229/425, 419, 447

[56] References Cited

U.S. PATENT DOCUMENTS 2,166,666  7/1939  Rolan .................. 24/602.5
4,262,829  4/1981  Hine, Jr. et al. ........... 224/32 R
4,460,114  7/1984  Grenier .................. 224/32 R
5,435,471  7/1995  Chuang ................. 224/32 R

FOREIGN PATENT DOCUMENTS 3151794  7/1983  Germany.
3927086  1/1991  Germany.

Primary Examiner—David J. Walczak
Attorney, Agent, or Firm—Morrison Law Firm

[57] ABSTRACT

A device for holding bags on bicycles, motorcycles and the like has at least one fastening clip on a retaining rail for holding a bag. The fastening clip closes around a rod of a carrier rack, a handle-bar or a strut of the bicycle, motorcycle or the like. The fastening clip is detachable from the rod, handlebar or strut against the force of a spring. The fastening clip is clamped around the rod, handle-bar or strut at its side opposite the bag. The fastening clip also includes a snap-on hook rotatably mounted against the force of the spring on an axis or at least one axle stub. A strap, carrying handle or the like is linked to the snap-on hook on its side facing the bag. By pulling on the strap, carrying handle or the like, a force is exerted on the spring. The snap-on hook moves around the axis or axle stubs on the fastening clip, releasing the rod, handle-bar or strut.

10 Claims, 2 Drawing Sheets

DEVICE FOR HOLDING BAGS ON BICYCLES, MOTORCYCLES AND THE LIKE

DESCRIPTION

The invention relates to a holding device for bags on bicycles, motorcycles and the like, with the characteristics of the generic part of claim 1.

Such a holding device—where attached to the bag is at least one fastening clip which is arranged in a closable manner around a bar of a carrier rack or the handle-bar or another strut of the bicycle, motorcycle or the like, and which is detachable from the rod of a carrier rack or the handle-bar against the force of a spring—is known, for example, from DE 39 27 086 A1. A disadvantage is that the attachment and detachment of the bag usually requires the additional operation of springs by hand, and that the position of the centre of gravity of the bag is unfavourable because of the way in which the mounting of the holding device is arranged.

It is therefore the objective of the present invention to create a device for holding bags on bicycles, motorcycles or the like, which can be simply pushed onto the rod of a carrier rack, the handle-bar or another strut and removed again, and which allows the selection of a favourable centre of gravity for the bag, so that when pack bags are fastened, they protrude only slightly beyond the carrier rack support, which is also an advantage for accommodating additional packs.

This objective is achieved by means of the characterizing part of claim 1. The other claims include further developments and advantageous embodiments of the invention.

According to the invention, the fastening clip for a bag of the type described above—on the side of the clip facing away from the bag—grips the rod or handle-bar or strut with a retaining hook and is provided with a snap-on hook which is rotatably mounted against the force of a spring about an axle or about one or two axle stubs, and which under the effect of the spring force grips around the rod or handle-bar from below and from the side of the bag. The snap-on hook, on its side facing the bag, is connected with a strap, a carrying handle or the like. By pulling the strap, carrying handle or the like, a force is exercised on the spring, and the snap-on hook is moved about the axle or axle stub(s) at the fastening clip, so that it releases the rod or handle-bar. Because the snap-on hook, closes from the outside, it is possible to attach the holding device also to so-called low-rider bicycles, thus facilitating their practically universal use.

The spring can be a leg spring or an elastic element or the like, and it is supported on one side by the fastening clip and on the other side by the snap-on hook.

It is an advantage when the snap-on hook on it underside is provided with a taper whose direction is such that in closed state a force acting on the taper from below, e.g. when it is set onto a rod, handle-bar or another strut, turns the snap-on hook back against the force of the spring.

According to a preferred embodiment of the invention, the fastening clip, on its side facing away from the rod, the handle-bar or the strut, turns into two legs (arranged at a distance from each other) between which the snap-on hook is rotatable mounted.

The strap or a flap or the like of the carrying handle is preferably fastened in a slot in the snap-on hook by means of a self-tapping plastic screw.

According to a preferred embodiment of the invention, the fastening clip on its side facing the bag is extended by a retaining part, and the bag is provided with a retaining rail running parallel to the rod, handle-bar or strut, with a recess, such as an oblong hole, in which the retaining part is fastened.

This can be accomplished in such a way that the retaining part is provided with a hole, and that fastening to the retaining rail is done by means of a screw which protrudes through the hole into the recess in the rail where it is bolted to a nut.

Advantageously the rail consists of a roughly semi-circular hollow profile whose open side faces the bag, and which has interior reinforcing ribs, and the nut with angled flange parts grips behind the reinforcing ribs.

According to a preferred embodiment of the invention, the retaining rail is provided in its upper edge with a retaining web, and the fastening clip, where it becomes the retaining part, has a retaining claw, and the retaining claw grips over the retaining web when the fastening clip is fastened to the retaining rail.

Figure 2:
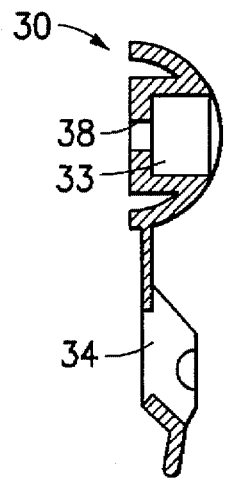
Figure 3:
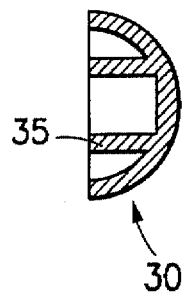
Figure 5:
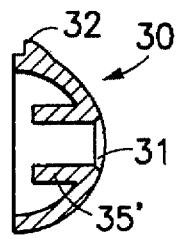
Figure 6:
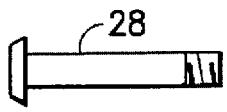
Figure 7:
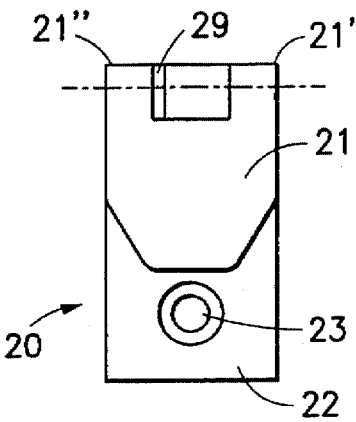
Figure 8:
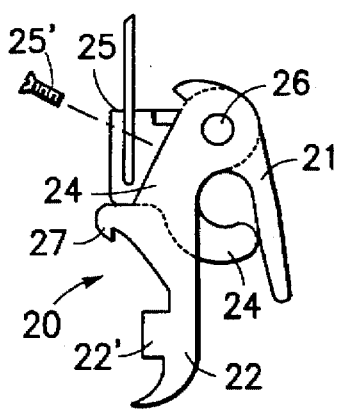
Figure 9:
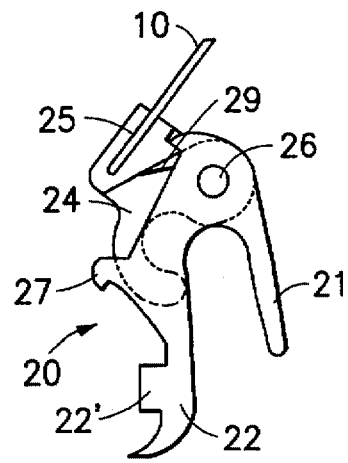

As an example, an embodiment of the invention is described below with reference to the drawings, as follows:

FIG. 1) a view of the complete holding device without bag;

FIG. 2) a section through the retaining rail in plane II—II;

FIG. 3) a section through the retaining rail in plane III—III;

FIG. 4) a nut;

FIG. 5) a section through the retaining rail in plane V—V;

FIG. 6) a fulcrum pin;

FIG. 7) a frontal view of a fastening clip;

FIG. 8) a lateral view of the fastening clip in closed state;

FIG. 9) a lateral view of the fastening clip in opened state;

The main components of the holding device 1 according to FIG. 1 are the carrying strap 10, fastening clips 20, and retaining rail 30. The retaining rail 30 can be connected with the bag (not shown here), for example by means of rivets in holes 33. The retaining rail 30 is an oblong, approximately semi-circular hollow profile whose hollow space faces the bag. To fasten the two fastening clips 20, the retaining rail 30 is provided with oblong holes 31, in which the fastening clips 20 are fixed with screws 23' and nuts. For this purpose, the fastening clips are provided with holes 23. The oblong holes 31 allow adjustability for various lengths of rods or struts. Moulded to the centre of the retaining rail is a strap buckle 34 into which a strap of the bag (not shown) is inserted in order to keep the bag closed and prevent its contents from falling out. Shown here on the fastening clips 20 are the retaining hooks 21, which grip over the rod, the handle-bar or the strut, and the retaining parts 22 for fastening to the retaining rail 30. The retaining rail 30 is provided with additional retaining webs 32 for the fastening clips 20.

Figure 4:
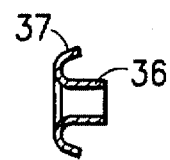

In FIGS. 2 to 5, the retaining rail 30 is shown in several planes, FIG. 4 shows only the nut 36 for the screw 23' of the fastening clip 20. In FIG. 2, i.e. in plane II—II, the retaining rail 30 is provided with a blind hole 33 and a hole 38, which are meant to accommodate the rivets connecting the bag. Moulded to the underside of the retaining rail 30 is the strap buckle 34. FIG. 3, i.e. plane III—III, shown the structure of retaining rail 30 over the major part of its length. Here, the retaining rail 30 is provided with two reinforcing ribs 35 running lengthwise. As FIG. 5 shows, in the area of the oblong holes 31, the reinforcing ribs 35' are shorter, so that they can accommodate nut 36, which with angled flange parts 37 grips behind the reinforcing ribs 35', and which because of the shorter reinforcing ribs 35' is flush with the base surface of the retaining rail 30. In the area of the connection with the fastening clips 30, the retaining webs 32 of the retaining rails 30 are arranged.

The function of the fastening clips 20 is explained by means of FIGS. 6 to 9; FIG. 6 shows only the fulcrum pin 28, which is bolted into the fastening clip 20, and about which the snap-on hook 24 rotates. The fastening clip 20, at its sides facing away from the bag, is provided with a retaining hook 21, which grips over the rod, strut or handle-bar. In the upper section, the retaining hook 21 of the fastening clip 20 is provided with two legs 21', 21" arranged at a distance, between which the upper part of the snap-on hook 24 is rotabably mounted on the fulcrum pin 28, which lies in or is bolted to holes 26 of the legs 21', 21". The snap-on hook 24 is spring-mounted against the fastening clip 20, with a leg spring 29 tending to press the lower, hook-shaped part of the snap-on hook 24 away from the bag and around the rod, strut or handle-bar from below. On its upper part, the snap-on hook, 24 is provided with a slot 25 which accommodates the carrying strap 10, which, for example, is fastened in slot 25 by a self-tapping plastic screw 25. When a tractive force is applied to the snap-on hook 24 through the carrying strap 10, the hook rotates about the fulcrum pin 28 against the force of the spring; the hook-shaped part releases the rod, strut or handle-bar, and the bag can be removed. The holding device is designed in such a way that the weight of the bag is enough to keep the snap-on hook open. However, to support the opening if need be, the snap-on hook 24 is provided on its underside with a taper whose direction is such tat in closed state a force acting on the taper from below, e.g. when it is set onto a rod, handle-bar or another strut, turns the snap-on hook 24 back against the force of the spring 29. Downward, the fastening clip 20 is extended by a retaining part 22 to connect with the retaining rail 30. The retaining part 22 is provided with a reinforcement 22' resembling an inserted tongue, in the direction of the retaining rail, to accommodate the hole for the screw which connects the nut. At its upper end, retaining part 22 is provided with a retaining claw 27, which grips behind the retaining webs of the retaining rail when the fastening clip 20 is bolted to the retaining rail.

I claim:

1. A holding device for a bag on one of a bicycle and a motorcycle, comprising:

at least one fastening clip on a retaining rail;

one side of said retaining rail attachable to said bag;

a front side of said at least one fastening clip facing away from said bag;

a back side of said at least one fastening clip facing said bag;

said at least one fastening clip being closable around a rod of one of a carrier rack, a handle-bar and a strut of one of said bicycle and said motorcycle;

said at least one fastening clip being releasable from said rod against a first force of a spring;

said front side gripping said rod with a retaining hook;

said fastening clip having a snap-on hook rotatably mounted against said first force of said spring about one of an axle and at least one axle stub;

a first side of said snap-on hook facing said bag;

a second side of said snap-on hook facing away from said bag;

said snap-on hook under said force of said spring gripping said rod from below said rod and from a side of said rod facing said bag;

said first side of said snap-on hook being connected with one of a strap and a carrying handle, such that a pulling force, applied to one of said strap and said carrying handle exerts a second force on said spring against said force, so that said snap-on hook moves about one of said axle and said at least one axle stub releasing said rod; and said pulling force capable of removing said bag from said rod, whereby only said pulling force applied to said one of a strap and a carrying handle releases and removes said bag from said rod.

2. A holding device according to claim 1, wherein said spring consists of one of a leg spring, a leaf spring and an elastic element, said spring being supported on one side by said fastening clip and on an other side by said snap-on hook.

3. A holding device according to claim 1, wherein said underside portion of said snap-on hook includes a taper;

said taper being disposed such that in a closed state, a third force acting on said taper from a bottom surface of said rod as said taper is set onto said rod, turns said snap-on hook back against said first force of said spring.

4. A holding device according to claim 1, wherein said fastening clip includes two legs on a top side facing away from said rod, said two legs being arranged at a distance from each other, and said snap-on hook being rotatably mounted between said two legs.

5. A holding device according to claim 1, wherein said one of said strap and said carrying handle is fastened in a slot in said snap-on hook by a self-tapping plastic screw.

6. A holding device according to claim 1, wherein a retaining part extends from said back side of said fastening clip, and said retaining rail runs parallel to said rod, said retaining part being fastened in a recess of said retaining rail.

7. A holding device according to claim 6, wherein said retaining part includes a hole, and said fastening clip is fastened to said retaining rail by a screw which protrudes through said hole into said recess in said retaining rail, said screw being bolted to a nut.

8. A holding device according to claim 7, wherein said retaining rail has a roughly semi-circular hollow profile having an open side facing said bag, said hollow profile having interior reinforcing ribs, and said nut having angled flange parts which grip behind said reinforcing ribs.

9. A holding device according to claim 8, wherein said recess in said retaining rail is an oblong hole.

10. A holding device according to claim 6, wherein a retaining web is disposed in an upper edge of said retaining rail, said fastening clip includes a retaining claw adjacent said retaining part, and said retaining claw grips said retaining web when said fastening clip is fastened to said retaining rail.

* * * * *